Jan. 3, 1950
J. McMORRIS
2,493,725
PARTIAL BURNING APPARATUS
Filed June 24, 1946
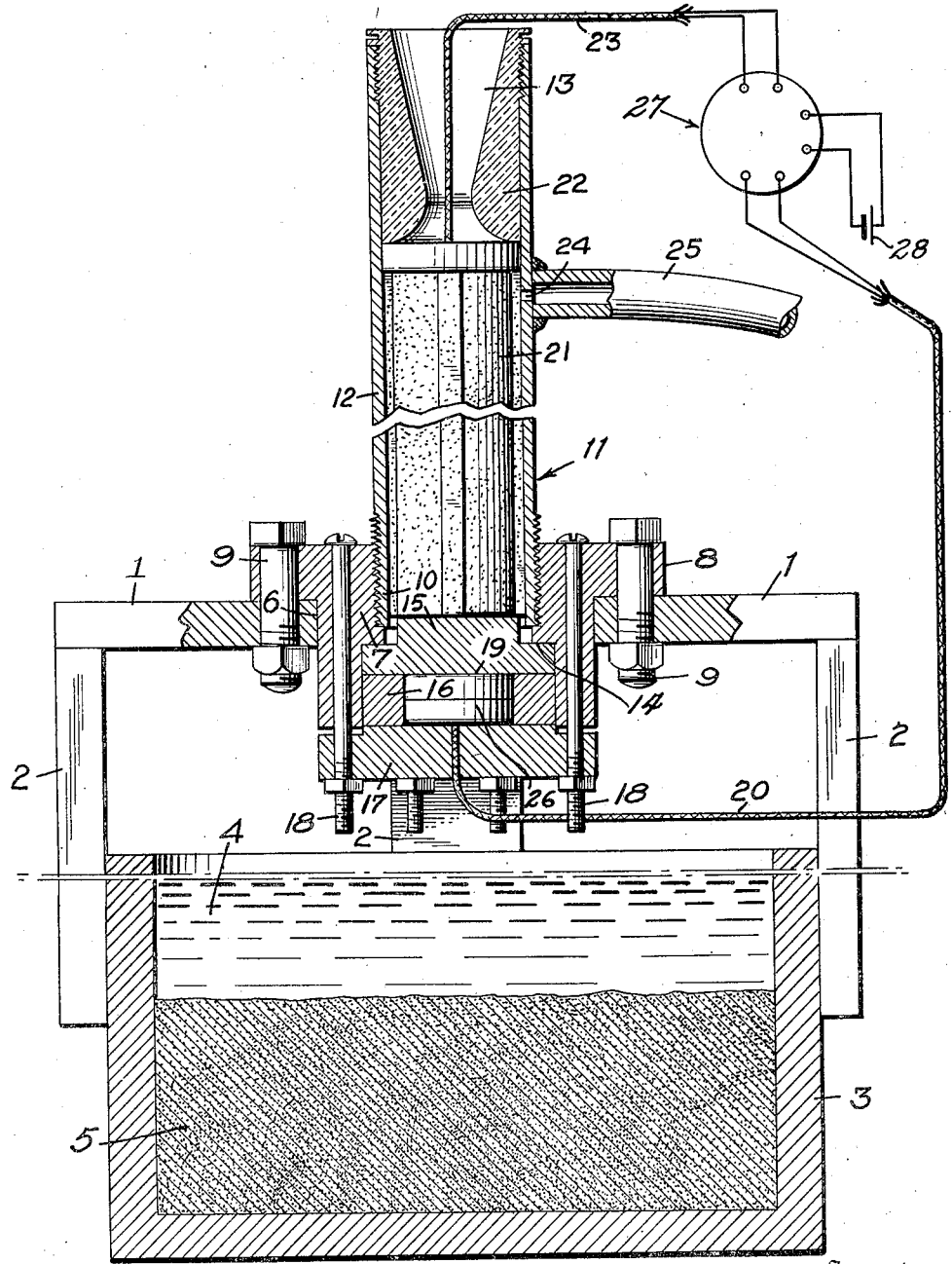
Inventor,
John McMorris, deceased, by
Helen C. McMorris, administratrix
By J. H. Church & H. E. Thibodeau
Attorneys

Patented Jan. 3, 1950

2,493,725

UNITED STATES PATENT OFFICE 2,493,725

PARTIAL BURNING APPARATUS

John McMorris, deceased, late of Pasadena, Calif., by Helen C. McMorris, administratrix, Pasadena, Calif., assignor to the United States of America as represented by the Secretary of War Application June 24, 1946, Serial No. 678,748

11 Claims. (Cl. 73—167)

The invention described herein may be manufactured and used by or for the Government for governmental purposes without the payment of any royalty thereon.

The present invention relates to rocket motor testing equipment and, more particularly, to apparatus for partially burning the propellant charge in a rocket motor to permit examination of the state of the charge at any predetermined time after ignition.

As is well known, it is customary to carry out static tests on rocket motors to develop information as to performance characteristics of the propellant charge. Among the tests carried out, for example, is to plot the pressure-time curve during burning of the propellant within the motor. In such a test, the rocket motor is mounted in a fixed position, usually vertically with the nozzle pointing upward, whereupon the propellant charge is ignited and readings are taken of the pressure generated within the motor at regular time intervals during burning. Heretofore, in the operation of such tests, it has not been possible to stop the burning of the propellant charge at an intermediate stage to permit inspection of the charge as an aid to determining the cause of any irregularities discovered during testing.

It is an object of the invention to provide means for stopping the burning of the propellant charge in a rocket motor at any predetermined time after ignition.

It is another object of the invention to provide means to permit ejection of the partially burned propellant charge from the rocket motor and to receive the same without mechanical damage.

A further object of the invention is to accomplish the foregoing objects without interfering with the simultaneous testing of the performance of the propellant charge such as, for example, the taking of pressure readings during burning.

Other objects will be apparent from the following disclosure of a specific embodiment of the invention as shown in the accompanying drawings in which the single figure is a front view, partially in cross-section, of the apparatus with a rocket motor installed thereon.

Referring to the drawings, the apparatus shown therein comprises a heavy plate or support 1 which is mounted horizontally by means of brackets 2 above a tank 3 adapted to hold a quantity of noninflammable liquid such as water 4. As will be explained more fully hereinafter, it also is desired to provide a layer of sand 5 in the bottom of the tank 3. Through an orifice 6 in the plate 1 situated above the tank 3 there extends a collar 7 which is secured to the plate 1 by means of a flange 8 thereon and bolts 9 extending therethrough.

The collar 7 is provided with a threaded portion adapted to receive the threaded end 10 of a standard rocket motor 11. When the cylindrical tube 12 of the motor 11 is screwed therein, the motor 11 is fixed in a substantially vertical position with its discharge nozzle 13 extending upward.

Within the collar 7, there is a shoulder 14 against which an end disk 15 is adapted to fit so as to close off the bottom end of the rocket motor tube 12. The end disk 15 is held in place by a spacer ring 16 and end plate 17, the latter being secured to the collar by means of shear bolts 18. The spacer ring 16 forms a cavity 19 between the end disk 15 and end plate 17 to receive a gunpowder charge preferably within a metal container 26. An ignition wire 20 extending through an orifice in the end plate 17 is provided for setting off the gunpowder charge as explained in more detail hereinafter.

The rocket motor 11 may be any of the standard types having the usual propellant charge as, for example, one or more extruded Ballistite tubes 21 and a retaining Venturi member 22 having an expansion passage 13. An ignition wire 23 is provided for igniting the propellant charge in the usual manner.

In order to permit measurements of the pressure generated in the rocket motor during burning of the propellant charge, there may be provided a small orifice 24 adjacent the upper end of the tube to which may be secured, for example, by brazing, an outlet tube 25 to which a pressure gage (not shown in the drawings) may be connected.

Suitable means may be provided for closing the circuit through ignition wires 20 and 23, in predetermined sequence. Such means are indicated generally at 27 as a commutator or circuit closing device supplied with potential from a source 28 and operable to first close the circuit through 23 to ignite the propelling charge 21 and then, a predetermined time later, to fire the charge in can 26 when charge 21 has been partially burned.

The ignition of the gunpowder charge causes the bolts 18 to be ruptured or sheared off, causing the end plate 17, spacer ring 16 and end disk 15, as well as the Ballistite tubes 21 in the rocket motor, to fall into the tank 3. The resulting abrupt pressure reduction in the motor extinguishes the propellant charge so that it remains in a desired partially burnt condition.

In the construction of the device, the bolts 18 have to be sufficiently strong to support the end disk 15 against motor pressure, but sufficiently weak to be sheared off by the ignition of the gunpowder charge. The exact size of the bolts 18 may be varied depending on the size of the rocket motor tested and the quantity of gunpowder charge used. In one series of experiment, for example, it was found to be satisfactory to use six ¼ inch stove bolts and a gunpowder charge of about 10 grams.

To prevent premature ignition of the gunpowder by hot gases leaking from the rocket motor past the end disk 15, it is preferred to seal the gunpowder charge and electric squib in a small metal can 26 which will fit within the cavity 19.

The design of the tank 3 does not appear to be critical. Successful experiments have been carried out, for example, using a round receptacle made of ½ inch steel, having a diameter of about 14 inches and a height of about 30 inches. A layer of about 5 inches of sand in the bottom of the tank plus a water depth of 18 inches has been found to be adequate to protect the ejected metal parts and the partially burned propellant charge from mechanical damage.

It thus is seen that the testing apparatus of the present invention permits the operator to extinguish the propellant charge at any desired time after ignition and to receive the partially burnt charge in an undamaged condition for visual examination.

It will be apparent that the specific embodiment of the invention described above will be subject to variation by one skilled in the art within the scope of the invention, and all such variations are intended to be included within the scope of the following claims.

It is claimed:

1. Apparatus for partially burning a propellant charge in a rocket motor comprising a tube having a nozzle at one end, said apparatus comprising means for mounting said motor in a fixed position, removable closure means for closing the end of the motor opposite from the nozzle, retaining means for holding the closure means in gas-tight relation over the end of the motor opposite from the nozzle, explosive means for removing said retaining means and means igniting said propellant charge and said explosive means in predetermined sequence.

2. Apparatus for partially burning a propellant charge in a rocket motor open at one end and having a nozzle at the other end, comprising means for mounting said motor in a fixed substantially vertical position with the nozzle extending upward, removable closure means for closing the open end of the rocket motor, a plate for positioning the closure means at the open end of the motor, an explosive charge between said closure means and said plate, means adapted to hold the plate and closure means against the thrust engendered by burning of said propellant charge but rupturable by said explosive charge.

3. Apparatus for partially burning a propellant charge comprising a rocket motor having a nozzle at one end, means for mounting said motor in a fixed substantially vertical position with the nozzle extending upward, releasable means closing the lower end of the rocket motor and retaining a propellant charge therein against the thrust engendered by burning of said charge, means for releasing said releasable means a predetermined time after the propellant charge is ignited and a receptacle for containing liquid disposed below the rocket motor for receiving said releasable means and the partially burnt propellant charge expelled from the rocket motor.

4. Apparatus for partially burning a propellant charge comprising a rocket motor having a nozzle at one end, a propellant charge in said motor, means for mounting said motor in a fixed substantially vertical position with the nozzle extending upward, removable closure means for closing the lower end of the rocket motor and retaining said propellant charge therein, retainer means for positioning said closure means in operable position, an explosive charge for removing said retainer means, means for igniting said propellant charge and said explosive charge in predetermined time sequence, and a liquid-containing receptacle disposed below the rocket motor for receiving said partially burnt propellant charge upon removal of said closure means.

5. Apparatus for partially burning a propellant charge comprising a substantially horizontal plate having an orifice therein, a rocket motor open at one end and having a nozzle at the other end, means for mounting said motor with the open end over said orifice and with the nozzle extending upward, a removable disk for closing the open end of the motor and for retaining a propellant charge therein, a retainer secured to the plate by rupturable bolts for positioning the disk at the open end of the motor, an explosive charge between the retainer and the disk for rupturing the bolts upon ignition so as to separate the retainer from the plate and permit the disk and partially burnt propellant charge to be ejected downwardly from the motor, a receptacle containing sand and water for receiving said retainer, disk and partially burnt propellant charge, and means for igniting the explosive charge a predetermined time after the propellant charge is ignited.

6. In an apparatus for partially burning a charge of propellant in a jet propelled device having a casing open at one end and provided with a nozzle at the other end, said apparatus comprising a frame, means mounting said casing in fixed position on said frame with said nozzle directed away from said frame, a closure for said open end, frangible means holding said closure in position closing the end of said casing, force applying means operable to break said frangible means, means igniting said propellant charge and operating said force-applying means in predetermined time sequence and means responsive to breakage of said frangible means for extinguishing the burning propellant.

7. In an apparatus for partially burning the propellant charge in a rocket motor having a nozzle at one end, means rigidly mounting said motor in a normally vertical position with the nozzle directed upwardly, removable closure means for the normally open end of said motor remote from said nozzle, frangible means securing said closure means in gas-tight relation with said normally open end, and explosive means operable on detonation to break said frangible means and permit said closure means to drop off.

8. In a device for partially burning the propellant charge of a rocket motor comprising a casing containing said charge and having a nozzle at one end, a liquid container, a frame mounted in superposed relation over said container, means mounting said casing in said frame in position over said container and with said nozzle directed away therefrom, a closure for the other end of said casing, frangible means holding said closure in gas-tight relation with the end of said casing remote from said nozzle, an explosive charge arranged, when detonated, to break said frangible means, and means for igniting said propellant charge and said explosive charge in predetermined time sequence, whereby the partially burned charge is deposited in said container in response to breakage of said frangible means.

9. In an apparatus for partially burning the propellant charge within a rocket motor having a nozzle at one end, a support having an aperture therein, a liquid container, means mounting said support over the open upper end of said container, a collar within said aperture and secured to said support, the bore of said collar having a downwardly-facing peripheral shoulder, the end of said motor remote from said nozzle being threaded into said collar above said shoulder, a cover disk within the bore of said collar and seating on said shoulder to form a gas-tight joint, a ring in said bore beneath said disk, a plate, frangible bolts passing through said collar and plate to hold said plate against said ring and said disk against said shoulder, an explosive charge within the cavity formed by said disk, ring and plate, and adapted, when detonated, to break said bolts whereby said propellant charge may drop into said container.

10. The apparatus as recited in claim 9, first electrical means for igniting said propellant charge, second electrical means for detonating said explosive charge, and timing means for operating said first and second electrical means in predetermined time sequence.

11. The apparatus as recited in claim 10 there being an aperture in the wall of said motor, and a tube having a gas-tight connection with said wall about said aperture whereby the pressure of burning propellant in said motor may be determined.

HELEN C. McMORRIS,
*Administratrix of Estate of John McMorris, Deceased.*

REFERENCES CITED

The following references are of record in the file of this patent:

UNITED STATES PATENTS

| Number | Name | Date |
|---|---|---|
| 1,489,566 | Webster | Apr. 8, 1924 |
| 2,111,315 | Damblanc | Mar. 15, 1938 |
| 2,448,203 | Africano | Aug. 31, 1948 |
| 2,464,179 | Hickman | Mar. 8, 1949 |